United States Patent [19]
Mao et al.

[11] Patent Number: 5,776,627
[45] Date of Patent: Jul. 7, 1998

[54] AROMATIC MONOMER GASSING AGENTS FOR PROTECTING NON-AQUEOUS LITHIUM BATTERIES AGAINST OVERCHARGE

[75] Inventors: Huanyu Mao, Burnaby; Ulrich von Sacken, Coquitlam, both of Canada

[73] Assignee: Moli Energy (1990) Limited, Canada

[21] Appl. No.: 728,274

[22] Filed: Oct. 8, 1996

[30] Foreign Application Priority Data

Nov. 17, 1995 [CA] Canada ................................. 2163187

[51] Int. Cl.⁶ .................................................. H01M 2/00
[52] U.S. Cl. ............................. 429/61; 429/57; 429/194
[58] Field of Search ............................. 429/61, 62, 57, 429/58, 90, 194, 94; 320/30, 39

[56] References Cited

U.S. PATENT DOCUMENTS

| 4,943,497 | 7/1990 | Oishi et al. |
| 5,567,539 | 10/1996 | Takahashi et al. ................. 429/57 |

FOREIGN PATENT DOCUMENTS

| 2093763 | 4/1993 | Canada |
| 2099657 | 6/1993 | Canada |
| 2156800 | 8/1995 | Canada |
| 536425 | 4/1992 | European Pat. Off. |
| 614239 | 2/1994 | European Pat. Off. |
| 4-249870 | 12/1990 | Japan |
| 4-332479 | 5/1991 | Japan |
| 7-302614 | 6/1994 | Japan |

OTHER PUBLICATIONS

*J. Electrochem. Soc.*, 131(6), Jun. 1984, pp. 1452–1456.

*Primary Examiner*—Anthony Skapars
*Attorney, Agent, or Firm*—Lerner, David, Littenberg, Krumholz & Mentlik

[57] ABSTRACT

Non-aqueous rechargeable lithium batteries are often equipped with internal electrical disconnect devices to protect against overcharge abuse. At the abnormally high voltages of overcharge, these devices can be activated by gasses generated as a result of the electrochemical polymerization of suitable monomer additives incorporated in the electrolyte. Aromatic compounds such as biphenyl are particularly suitable aromatic additives for $LiCoO_2$ based lithium ion batteries.

18 Claims, 4 Drawing Sheets

AROMATIC MONOMER GASSING AGENTS FOR PROTECTING NON-AQUEOUS LITHIUM BATTERIES AGAINST OVERCHARGE

FIELD OF THE INVENTION

This invention pertains to non-aqueous rechargeable lithium batteries and to methods for improving the safety thereof. Specifically, it pertains to the use of aromatic monomer additives as means for generating gas for purposes of pressure activating overcharge protection devices in lithium ion batteries.

BACKGROUND OF THE INVENTION

The demand for rechargeable batteries having ever greater energy density has resulted in substantial research and development activity in rechargeable lithium batteries. The use of lithium is associated with high energy density, high battery voltage, long shelf life, but also with safety problems (ie. fires). As a result of these safety problems, many rechargeable lithium battery electrochemistries and/or sizes are unsuitable for use by the public. In general, batteries with electrochemistries employing pure lithium metal or lithium alloy anodes are only available to the public in very small sizes (eg. coin cell size) or are primary types (eg. non-rechargeable). However, larger rechargeable batteries having such electrochemistries can serve for military or certain remote power applications where safety concerns are of somewhat lesser importance.

Recently, a type of rechargeable lithium battery known as lithium-ion or 'rocking chair' has become available commercially and represents a preferred rechargeable power source for many consumer electronics applications. These batteries have the greatest energy density (Wh/L) of presently available conventional rechargeable systems (ie. NiCd, NiMH, or lead acid batteries). Additionally, the operating voltage of lithium ion batteries is often sufficiently high such that a single cell can suffice for many electronics applications.

Lithium ion batteries use two different insertion compounds for the active cathode and anode materials. 3.6 V lithium ion batteries based on $LiCoO_2$/pre-graphitic carbon electrochemistry are now commercially available. Many other lithium transition metal oxide compounds are suitable for use as cathode material, including $LiNiO_2$ and $LiMn_2O_4$. Also, a wide range of carbonaceous compounds is suitable for use as the anode material, including coke and pure graphite. The aforementioned products employ nonaqueous electrolytes comprising $LiBF_4$ or $LiPF_6$ salts and solvent mixtures of ethylene carbonate, propylene carbonate, diethyl carbonate, ethyl methyl carbonate, and the like. Again, numerous options for the choice of salts and/or solvents in such batteries are known to exist in the art.

Lithium ion batteries can be sensitive to certain types of abuse, particularly overcharge abuse wherein the normal operating voltage is exceeded during recharge. During overcharge, excessive lithium is extracted from the cathode with a corresponding excessive insertion or even plating of lithium at the anode. This can make both electrodes less stable thermally. Overcharging also results in heating of the battery since much of the input energy is dissipated rather than stored. The decrease in thermal stability combined with battery heating can lead to thermal runaway and fire on overcharge. Many manufacturers have decided to incorporate additional safety devices as a greater level of protection against overcharge abuse. For instance, as described in U.S. Pat. No. 4,943,497 and Canadian Patent Application Serial No. 2,099,657, filed Jun. 25, 1993, respectively, the present products of Sony Corp. and Moli Energy (1990) Limited incorporate internal disconnect devices which activate when the internal pressure of the battery exceeds a predetermined value during overcharge abuse.

These pressure activated disconnect devices thus rely on battery constructions wherein the internal pressure is maintained below the predetermined value over a wide range of normal operating conditions yet, during overcharge, the internal pressure reliably exceeds said value. In Canadian Patent Application Serial No. 2,093,763, filed Apr. 8, 1993, a net increase in internal solids volume is employed to hydraulically activate a disconnect device reliably at a specified state of overcharge.

In the aforementioned U.S. Pat. No. 4,943,497, enabling constructions comprise various cathode compounds and/or additives (eg. $LiNiO_2$, $LiNi_yCo_{1-y}O_2$) that result in sufficient gas generation above a certain voltage during overcharge so as to activate the disconnect device. Alternately, in European Patent Application No. 536425, Sony discloses the use of a small percentage of $Li_2CO_3$ as a cathode additive that serves as a gassing agent in a similar manner.

Some aromatic compounds containing methyl groups have been used in electrolyte solvent mixtures and/or as electrolyte solvent additives in certain specific rechargeable non-aqueous lithium batteries. For instance, in Japanese Patent Application Laid-open No. 04-249870, toluene is used as an electrolyte solvent and/or electrolyte additive to enhance cycle life. In Japanese Patent Application Laid-open No. 04-332479, toluene, xylene, and mesitylene are suggested for use as electrolyte additives to stop further heat generation from occurring after an internal disconnect device is activated on overcharge. Thus, these additives are not employed for purposes of generating gas per se. Therein, however, it is speculated that methane is produced as a result of oxidation of the toluene at the voltages experienced during overcharge.

Additionally, some aromatic heterocyclic compounds have been used as electrolyte solvent additives for purposes of enhancing cycle life in certain specific rechargeable non-aqueous lithium batteries. In Japanese Patent Application Laid-open No. 61-230276, a laboratory test cell employing an electrolyte comprising a furan solvent additive demonstrated an improved cycling efficiency for plated lithium metal. In Japanese Patent Application Laid-open No. 61-147475, a polyacetylene anode, $TiS_2$ cathode battery employing an electrolyte comprising a thiophene solvent additive showed better cycling characteristics than similar batteries without the additive.

In European Patent Application No. 614,239, Tadiran disclose a method for protecting non-aqueous rechargeable lithium batteries against both overcharge and overtemperature abuse via use of a polymerizing electrolyte. The liquid electrolyte polymerizes at battery voltages greater than the maximum operating voltage or maximum operating temperature of the battery thereby increasing the internal resistance of the battery and protecting the battery. The method is suitable for lithium batteries employing pure lithium metal, lithium alloy, and/or lithium insertion compound anodes.

It is known in the art that certain aromatic compounds, including heterocyclic compounds, can be polymerized electrochemically (eg. R. J. Waltman et al. investigated the properties of electropolymerized polythiophene in J. Electrochem. Soc., 131 (6), 1452–6, 1984.)

Co-pending Canadian Patent Application Serial No. 2,156,800, filed Aug. 23, 1995 by a common inventor, discloses the use of polymerizable aromatic monomers additives for purposes of protecting a rechargeable lithium battery during overcharge. Therein, a small amount of polymerizable aromatic additive is mixed in the liquid electrolyte. During overcharge abuse, the aromatic additive polymerizes at voltages greater than the maximum operating voltage of the battery thereby increasing its internal resistance sufficiently for protection. No mention is made therein about the possible use of similar additives as gassing agents in batteries comprising internal disconnect devices.

SUMMARY OF THE INVENTION

Many non-aqueous rechargeable lithium batteries have internal electrical disconnect devices for purposes of providing overcharge protection. These disconnect devices are typically activated by internal battery pressure that exceeds a predetermined setpoint. We have discovered that a small amount of certain monomers in the battery electrolyte can polymerize to generate gas that can be used successfully for pressure activation of the internal electrical disconnect device. Thus, the invention comprises both methods for providing overcharge protection and battery embodiments thereof.

Generally, these batteries comprise a lithium insertion compound cathode, a lithium compound anode (eg. lithium metal, lithium alloy, or lithium insertion compound), and a non-aqueous liquid electrolyte. For lithium ion batteries, the lithium insertion compound cathode can be $Li_xCoO_2$, or alternately can be selected from the group consisting of $Li_xNiO_2$ and $Li_xMn_2O_4$. The lithium compound anode can be a carbonaceous insertion compound. The liquid electrolyte solvent can comprise organic carbonates such as ethylene carbonate, propylene carbonate, diethyl carbonate, and ethyl methyl carbonate. The liquid electrolyte solute can comprise lithium salts such as $LiBF_4$ and $LiPF_6$. Typically, the maximum operating charging voltage is greater than 4 volts.

Batteries of the invention have a monomer additive mixed in the liquid electrolyte wherein the monomer additive polymerizes at battery voltages greater than the maximum operating voltage thereby generating gas. The amount of monomer additive must be sufficient that the generated gas pressure activates the disconnect device during overcharge abuse. Amounts of less than about 5% monomer additive by weight in the mixture of liquid electrolyte and monomer additive can be sufficient.

The monomer additive can be aromatic. Biphenyl is a particularly suitable additive that can be effective in amounts of about 2% by weight in the mixture of liquid electrolyte and aromatic additive.

Aromatic compounds have ring structures wherein the positions of the constituent atoms of the ring are known as nodes. The number of nodes wherein polymerization can occur is known as the functionality of the aromatic. Polymerization of the aromatic additive can occur at ring nodes having hydrogen attachments, thereby generating hydrogen gas. Methane gas may not be generated if the polymerization of the aromatic additive occurs at ring nodes having attachments other than methyl. It can be advantageous to employ an aromatic additive wherein polymerization can occur at greater than 5 nodes (ie. wherein the functionality >5).

In a specific embodiment, the invention pertains to a non-aqueous rechargeable lithium battery having a maximum operating charging voltage comprising: (a) a lithium insertion compound cathode; (b) a lithium compound anode; (c) a non-aqueous liquid electrolyte; (d) an internal electrical disconnect device, said disconnect device activating at a predetermined internal pressure; and (e) a monomer additive mixed in said liquid electrolyte, said monomer additive polymerizing at battery voltages greater than the maximum operating voltage thereby generating gas and pressure activating the disconnect device during over-charge abuse. The aromatic additive can be selected from the group consisting of: thiophene, 3-bromothiophene, 3-chlorothiophene, 3-fluorothiophene, 1,2-dimethoxybenzene, 1-methyl-3-(pyrrol-1-ylmethyl) pyrridinium tetrafluoro-borate, biphenyl, furan.

BRIEF DESCRIPTION OF THE DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

Figure 1:
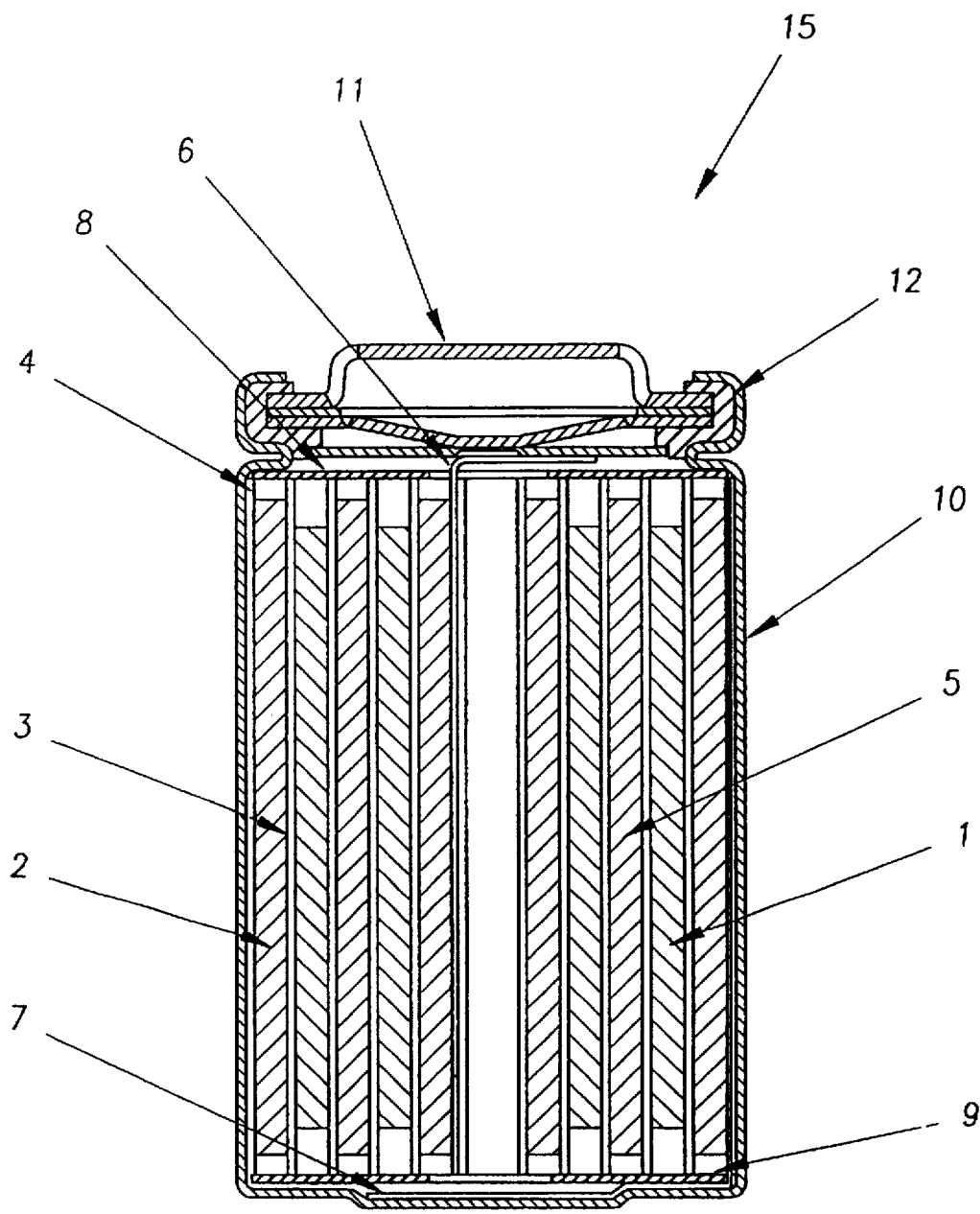
FIG. 1 depicts a cross-sectional view of a preferred embodiment of a cylindrical spiral-wound lithium ion battery.

Cathode additives have been used successfully as gassing agents (pressure creators) for purposes of pressure activating internal electrical pressure sensitive disconnect devices during overcharge of certain non-aqueous rechargeable lithium batteries. However, as a caution, excessive additive must be avoided because use of such cathode additives results in a reduction in active cathode weight and hence battery capacity. Herein, it is shown how overcharge protection can be provided in similarly equipped batteries by incorporating a small amount of a suitable monomer additive in the electrolyte, without significantly reducing battery capacity. The monomer additive serves as a gassing agent in the electrolyte. Adverse effects on battery performance can be avoided if the additive is relatively inert with respect to the battery electrochemistry and if it is present in small amounts (eg. such that its presence does not affect the bulk properties of the electrolyte, and other components).

Although any monomer may work in principle, we have discovered that aromatic monomers can be particularly suitable since the polymerization potentials can be in a range that is suitable for this application and the polymerization reactions can produce gaseous by-products. Additionally, aromatic compounds have an advantage in that in small amounts they are often compatible with lithium battery chemistries.

As discussed in *Organic Chemistry* by R. J. Fessenden et al., Willard Grant Press, 1979, the term aromatic refers to a class of ring compounds that are substantially stabilized by pi-electron delocalization. Such compounds are cyclic, planar, and each atom in the ring has a p orbital perpendicular to the plane of the ring ($sp^2$-hybrid state). Also, the ring system must have $4n+2$ pi electrons where n is an integer (the Huckel rule). The term heterocyclic (see *The Condensed Chemical Dictionary* 9th Ed., G. G. Hawley, Van Nostrand Reinhold, 1977) denotes a closed-ring structure, usually of either 5 or 6 members, in which one or more of the atoms in the ring is an element other than carbon (eg. sulfur, oxygen, and nitrogen.)

Examples of aromatic compounds are biphenyl, furan, thiophene, and derivatives thereof. Table 1 (taken from the aforementioned co-pending Canadian Patent Application Serial No. 2,156,800 by the same inventor) shows the polymerization potential for several such compounds as determined in a variety of ways. It should be noted, however, that the polymerization potentials depend to some extent on the electrodes and other electrolyte components employed in the electrochemical system. These values thus are useful for suggesting potential aromatic compound candidates for the instant application. Under actual battery conditions, a compound may be suitable if it polymerizes at voltages above the maximum operating charging voltage of the battery but below the overcharge voltage at which the battery is hazardous (eg. the voltage during overcharge just prior to catching fire).

TABLE 1

| Aromatic Compound | Polymerization Potential (Volts vs. Li/Li$^+$) |
| --- | --- |
| Thiophene | 5.34 |
| 3-Bromothiophene | 5.401 |
| 3-Chlorothiophene | 5.461 |
| 3-Fluorothiophene | 5.481 |
| 1,2-Dimethoxybenzene | 4.937 |
| 1-Methyl-3-(pyrrol-1-ylmethyl) pyrridinium tetrafluoroborate | 4.411 |
| Biphenyl | 4.70 |
| Furan | 5.20 |

Additives meeting the preceding polymerization voltage criteria are thus potentially suitable for purposes of generating gas in a sufficient amount and at a sufficient rate to activate the disconnect before hazardous thermal runaway can occur. However, there is the possibility that polymerization may proceed somewhat differently in the actual battery environment. Also, polymerization of the additive may not result in a sufficient amount of generated gas and/or may not proceed at a sufficient rate to pressure activate the disconnect before thermal runaway can occur. Finally, the amount of the additive must be such that battery performance is otherwise not adversely affected to any significant degree. Suitable additives therefore must be relatively inert with respect to lithium and to the electrodes (ie. should not be capable of reacting with or insertion therein). Also, suitable additives should not cause a substantial increase in the internal resistance or impedance of the battery during normal operation (ie. should not adversely affect cycle life). It should be noted too that certain additives after polymerization may be electrically conductive and hence the use thereof introduces the possibility of creating an internal short after an overcharge abuse. This may actually prove advantageous under certain circumstances (as in Example v following).

Consequently, some non-inventive empirical trials are required in order to determine the suitability of a particular additive candidate for any given battery application. These trials would be expected to include overcharge testing of trial batteries comprising varied amounts of additive candidate. Either during or after the selection of an enabling amount of an additive, some performance testing of trial batteries is also required to completely test for adverse effects on performance. Such trials should be well within the scope of those skilled in the art and should not require inventive ingenuity.

With the exception of the presence of the aromatic monomer additive, the construction of batteries of the invention is conventional. Generally, an enabling amount of additive is simply mixed in with the bulk electrolyte at some preferred point during normal battery assembly. Minor handling changes may of course be required to account for differences in the properties of the bulk electrolyte and the additive (eg. vapor pressure, toxicity, etc.).

Non-aqueous rechargeable lithium batteries appear in various configurations commercially (ie. prismatic formats or miniature coin cells) and many different components may be used. A preferred construction for a lithium ion type product is depicted in the cross-sectional view of a conventional spiral-wound battery in FIG. 1. A jelly roll 4 is created by spirally winding a cathode foil 1, an anode foil 2, and two microporous polyolefin sheets 3 that act as separators.

Cathode foils are prepared by applying a mixture of a suitable powdered (about 10 micron size typically) cathode material, such as a lithiated transition metal oxide, possibly other powdered cathode material if desired, a binder, and a conductive dilutant onto a thin aluminum foil. Typically, the application method first involves dissolving the binder in a suitable liquid carrier. Then, a slurry is prepared using this solution plus the other powdered solid components. The slurry is then coated uniformly onto the substrate foil. Afterwards, the carrier solvent is evaporated away. Often, both sides of the aluminum foil substrate are coated in this manner and subsequently the cathode foil is calendered.

Anode foils are prepared in a like manner except that a powdered (also typically about 10 micron size) carbonaceous insertion compound is used instead of the cathode material and thin copper foil is usually used instead of aluminum. Anode foils are typically slightly wider than the cathode foils in order to ensure that anode foil is always opposite cathode foil.

The jelly roll 4 is inserted into a conventional battery can 10. A header 11 and gasket 12 are used to seal the battery 15. The header includes an internal electrical disconnect device similar to that shown in the aforementioned Canadian Patent Application Serial No. 2,099,657 and additional safety devices if desired. Often, a safety vent is incorporated that ruptures if excessive pressure builds up in the battery. Also, a positive thermal coefficient device (PTC) may be incorporated into the header to limit the short circuit current capability of the battery. The external surface of the header 11 is used as the positive terminal, while the external surface of the can 10 serves as the negative terminal.

Appropriate cathode tab 6 and anode tab 7 connections are made to connect the internal electrodes to the external terminals. Appropriate insulating pieces 8 and 9 may be inserted to prevent the possibility of internal shorting. Prior to crimping the header 11 to the can 10 in order to seal the battery, electrolyte 5 is added to fill the porous spaces in the jelly roll 4.

In batteries of the invention, the electrolyte 5 additionally comprises an enabling amount of monomer additive. Thus, little gas is generated as a result of polymerization reactions during normal battery operation. However, on overcharge an activating amount of gas is quickly generated in time to prevent thermal runaway of the battery. As long as a disconnect device activating amount of gas is generated in a timely manner, the void space in the battery (ie. the volume not occupied by solids or liquid) can be made relatively large and need not be too closely controlled. In this way, minor expansion of battery components and minor amounts of gas generated via other reactions will not activate the internal disconnect device during normal battery operation.

The following discussion is provided for purposes of illustration, but should not be construed as limiting in any way. As shown in the examples to follow, biphenyl is a polymerizable aromatic additive that is a suitable electrolyte gassing agent at a 2% weight level in some conventional lithium ion batteries. Aromatic compounds in general have ring structures wherein the positions of the constituent atoms of the ring are known as nodes. The functionality of the aromatic compound is defined herein as the number of nodes wherein polymerization can occur. For instance, biphenyl and toluene have functionalities of 10 and 5 respectively.

Without being bound by theory, electrochemical polymerization of the additive is believed to occur at the cathode resulting in the formation of polymer on the cathode surfaces. For aromatic additives, the electrochemical polymerization is believed to proceed via bonding at the ring nodes. For ring nodes having hydrogen attachments, hydrogen gas can be generated as a by-product at the anode. (As two molecules polymerize at such nodes, a hydrogen attachment is liberated from each molecule. The two liberated hydrogens combine at the anode to produce hydrogen gas.)

The generation of hydrogen gas can be preferred in this application because hydrogen is relatively insoluble in conventional non-aqueous battery electrolytes. By-product hydrogen gas is thus not absorbed by the battery electrolyte. In turn, pressure activation of the internal disconnect device can occur without the need for excess reactants in order to compensate for such absorption. Additionally, activation can desirably occur earlier during overcharge abuse.

It can also be advantageous to employ an aromatic additive wherein polymerization can occur at a large number of nodes (ie. high functionality). More polymer bonds can then be formed and hence more gas can be produced per mole of additive. Additionally, the likelihood of two monomers (or molecules derived thereform) polymerizing is greater as the functionality increases since there are more possible reaction sites. Consequently, the polymerization rate can be greater with higher functionality and thus provide activation earlier during overcharge abuse.

The following Examples are provided to illustrate certain aspects of the invention but should not be construed as limiting in any way. 18650 size (18 mm diameter, 650 mm height) cylindrical batteries were fabricated as described in the preceding and shown generally in FIG. 1. Cathodes 1 comprised a mixture of $LiCoO_2$ powder, a carbonaceous conductive dilutant, and polyvinylidene fluoride (PVDF) binder uniformly coated on both sides of a thin aluminum foil about 5.4 cm in width by 49.5 cm in length. Coating weight was about 47 mg/cm$^2$. Anodes 2 were made using a mixture of a spherical graphitic powder plus Super S (trademark of Ensagri) carbon black and polyvinylidene fluoride (PVDF) binder (in amounts of about 2% and 10% by weight respectively to that of the spherical graphitic powder) uniformly coated on thin copper foil of similar length to the cathode but 3 mm greater in width. Coating weight was about 23 mg/cm$^2$. Celgard® 2500 microporous polypropylene film was used to form the separators 3. Unless indicated otherwise, the electrolyte 5 was a solution of 1.5M $LiBF_4$ salt dissolved in a solvent mixture of ethylene carbonate (EC), propylene carbonate (PC), and diethyl carbonate (DEC) in a EC/PC/DEC volume ratio of 30/20/50. Approximately 5 cc of electrolyte was used in each battery. Unless otherwise indicated, the batteries were equipped with a pressure relief vent and internal electrical disconnect devices as described in the aforementioned Canadian Patent Application Serial No. 2,099,657. All batteries were initially conditioned at 21±1° C. by charging, discharging, and then charging again to the normal maximum operating voltage of 4.1 volts.

Figure 2A:
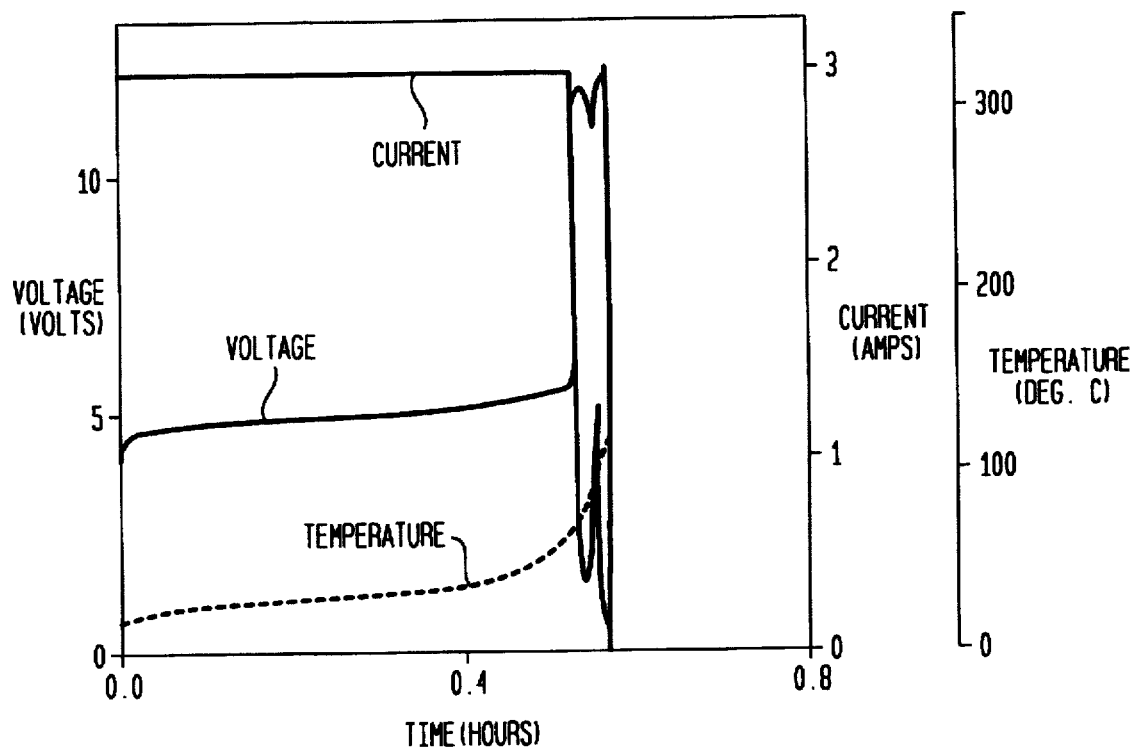
FIGS. 2a and b show graphically the voltage, temperature, and current data during 21° C. overcharge of the comparison battery without a gassing agent additive and the battery of the invention in Example i respectively.
Figure 2B:
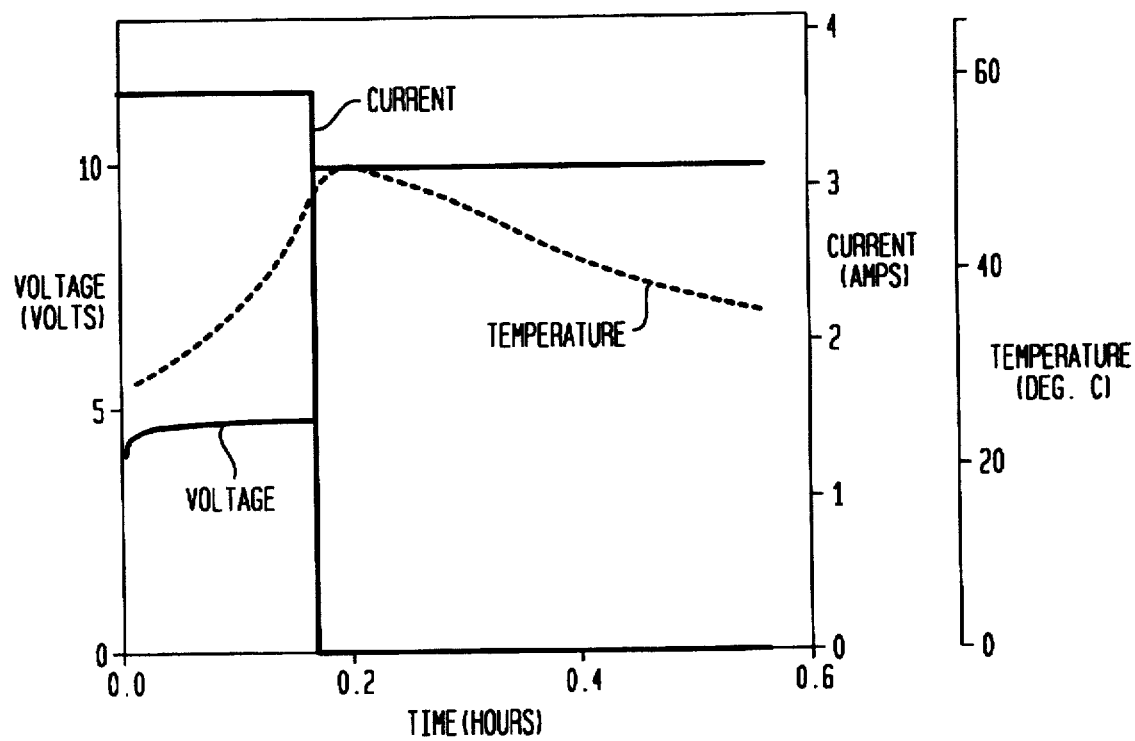

EXAMPLES i) Two 18650 size batteries were assembled as described above except that the first had no gassing agent additive while the second comprised 2% by weight biphenyl additive in the electrolyte. (Note that biphenyl is a solid at room temperature and thus is conveniently quantified by weight rather than by volume.) Both were overcharge tested at a background temperature of 21° C. using a current supply with 10 volt compliance. The batteries were overcharged at 3 and 3.6 amps respectively. The first battery vented violently and burned with a substantial flame after about 0.55 hours of overcharging. In the second battery, even though using a higher current, the internal disconnect device activated after about 0.17 hours and the test concluded without incident (no venting nor flame). FIGS. 2a and b show the voltage, temperature, and current data versus time for each battery during overcharge.

Figure 3:
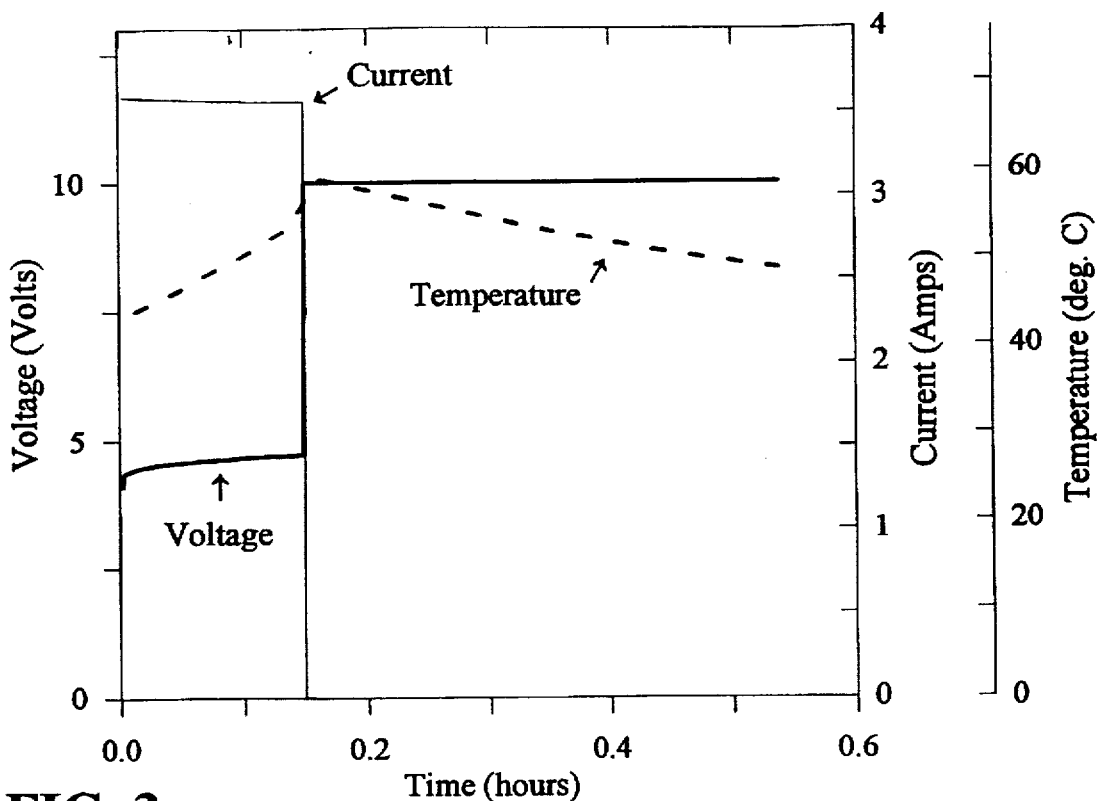
FIG. 3 shows graphically the voltage, temperature, and current data during 45° C. overcharge of the battery in Example ii.
Figure 4:
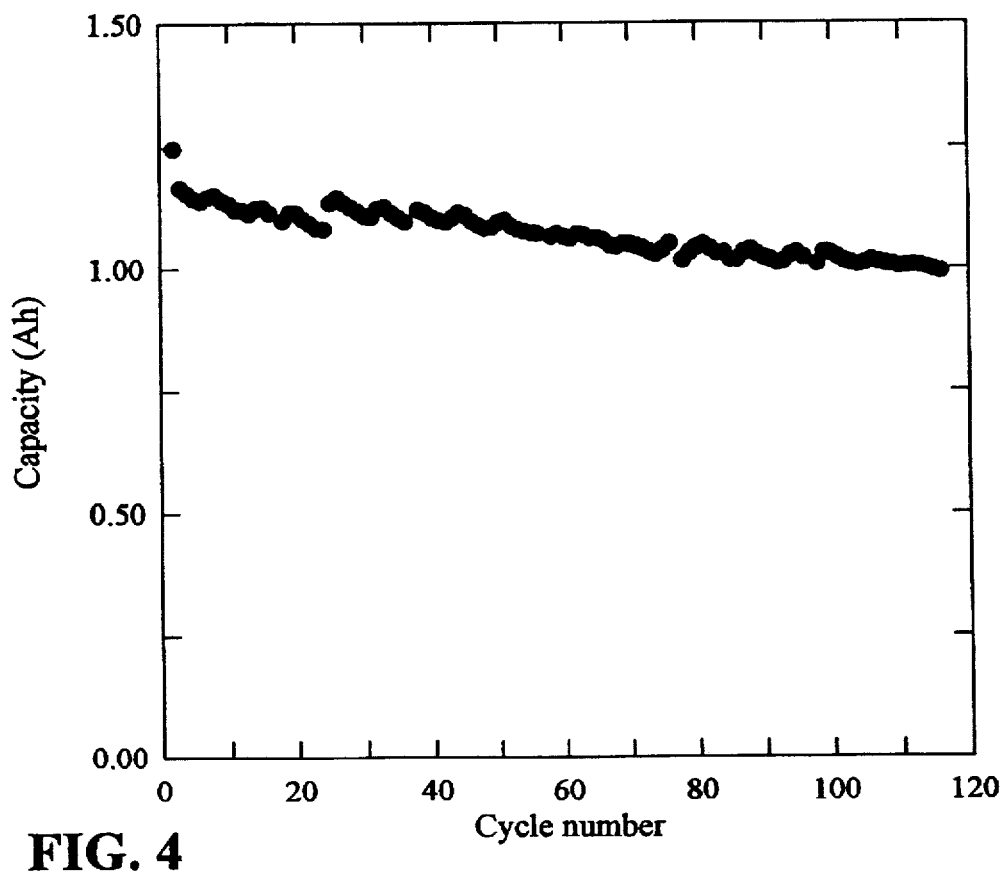
FIG. 4 shows graphically the capacity versus cycle number data for the battery in Example iii.
Figure 5A:
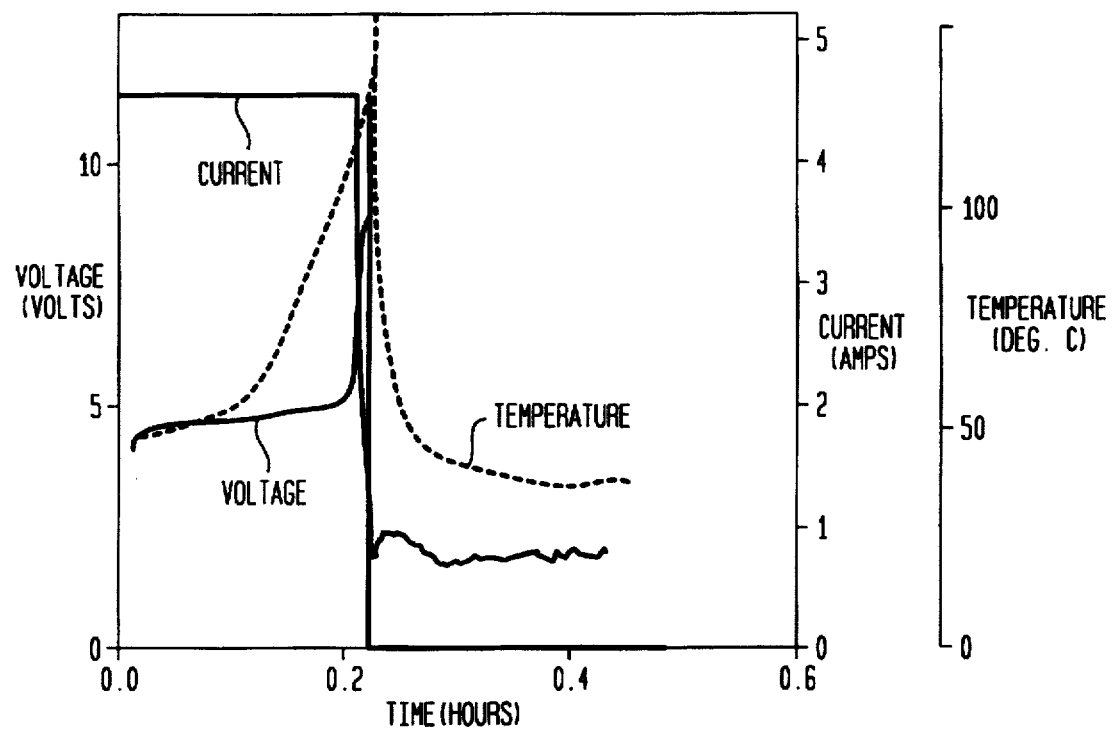
FIGS. 5a and b show graphically the voltage, temperature, and current data during 45° C. overcharge of the comparison battery without an electrical disconnect device and the battery of the invention in Example iv respectively.
Figure 5B:
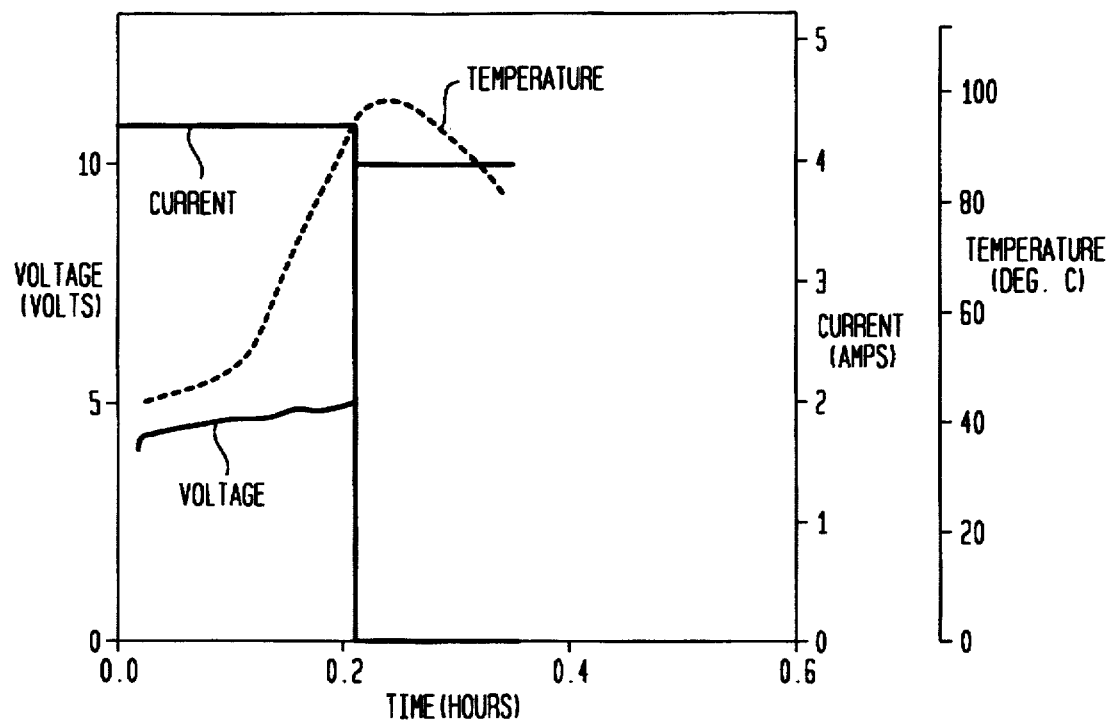

The presence of the biphenyl additive results in an increase in internal pressure (via gas generation) during overcharge that is sufficient to activate the disconnect device.

ii) A 18650 size battery was assembled as described above and comprising 2% by weight biphenyl additive in the electrolyte. The battery was overcharge tested at a background temperature of 45° C. using a 3.6 amp current supply with 10 volt compliance. The internal disconnect device activated after about 0.14 hours and the test concluded without incident (no venting nor flame). FIG. 3 shows the voltage, temperature, and current data versus time for this battery during overcharge.

iii) A 18650 size battery was assembled as described above except that the electrolyte comprised 5% by weight biphenyl additive. The battery was then charged to 4.1 volts and stored at 60° C. for one week. Thereafter, the battery was cycled at 21° C. using a constant 1 amp current discharge to 2.5 volts and a current limited, constant voltage charge to 4.1 volts. Every 20 cycles, a series of discharge currents with decreasing magnitude was applied in a stepwise fashion to determine if any capacity loss was recovered at a lower discharge rate. FIG. 4 shows the capacity versus cycle life data for this battery. Excellent cycling results are still obtained even with the presence of 5% by weight additive.

iv) Two 18650 size batteries were assembled as described above except that the electrolyte for both was a solution of 1.0M $LiPF_6$ salt dissolved in a solvent mixture of ethylene carbonate (EC), ethyl methyl carbonate (EMC), and diethyl carbonate (DEC) in a EC/EMC/DEC volume ratio of 30/50/20 that additionally comprised 2% by weight biphenyl additive. Also, the first battery had no internal disconnect device while the second did. Both were overcharge tested at a background temperature of 45° C. using a 4.5 amp current supply with 10 volt compliance. The first battery vented violently and burned with a substantial flame after about 0.22 hours of overcharging. In the second battery, the internal disconnect device activated after about 0.21 hours and the test concluded without incident (no venting nor flame). FIGS. 5a and b show the voltage, temperature, and current data versus time for each battery during overcharge.

These particular battery embodiments are not protected against overcharge by the presence of biphenyl alone. Polymerization of the additive occurs. However, polymerization is not sufficiently rapid or sufficiently great to cause an increase in internal resistance of the battery to shutdown the battery before a thermal runaway occurs.

v) Two 18650 size batteries were assembled as in Example i) above (ie. the first had no gassing agent additive while the second comprised 2% by weight biphenyl additive in the electrolyte.) Both were subjected to 12 minutes of over-charge abuse as in Example i). The voltage of the batteries was then monitored for about 19 hours. The voltage of the first was stable over this period at about 4.5 volts. The voltage of the second dropped continously to about 4.05 volts by the end of this period. Each battery was then subjected to nail penetration abuse which results in a hard internal short. The first battery vented explosively with flame. The second battery did not vent or burn.

The battery comprising biphenyl additive discharged itself somewhat after a partial overcharge. This may be a result of internal shorting via the formation of electrically conducting polymer or a result of a chemical shorting via the oxidation and reduction of generated hydrogen gas at the cathode and anode respectively (seen in some primary batteries). Regardless, the overcharged battery comprising biphenyl discharged itself sufficiently to be safer on subsequent mechanical abuse.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A non-aqueous rechargeable lithium battery having a lithium insertion compound cathode; a lithium compound anode; a non-aqueous liquid electrolyte; a maximum operating charging voltage; and an internal electrical disconnect device; said disconnect device activating at a predetermined internal pressure, wherein the battery comprises a monomer additive mixed in said liquid electrolyte, said monomer additive polymerizing at battery voltages greater than the maximum operating voltage thereby generating gas and pressure activating the disconnect device during overcharge abuse.

2. A non-aqueous rechargeable lithium battery as claimed in claim 1 wherein the mixture of liquid electrolyte and monomer additive comprises less than about 5% monomer additive by weight.

3. A non-aqueous rechargeable lithium battery as claimed in claim 1 wherein the monomer additive is aromatic.

4. A non-aqueous rechargeable lithium battery as claimed in claim 3 wherein the polymerization of the aromatic additive occurs at ring nodes having hydrogen attachments.

5. A non-aqueous rechargeable lithium battery as claimed in claim 4 wherein the generated gas is hydrogen.

6. A non-aqueous rechargeable lithium battery as claimed in claim 4 wherein the aromatic additive is biphenyl.

7. A non-aqueous rechargeable lithium battery as claimed in claim 6 wherein the mixture of liquid electrolyte and aromatic additive comprises about 2% biphenyl additive by weight.

8. A non-aqueous rechargeable lithium battery as claimed in claim 3 wherein the polymerization of the aromatic additive occurs at ring nodes having attachments other than methyl.

9. A non-aqueous rechargeable lithium battery as claimed in claim 3 wherein the aromatic additive has functionality greater than 5.

10. A non-aqueous rechargeable lithium battery as claimed in claim 1 wherein the maximum operating charging voltage is greater than 4 volts.

11. A non-aqueous rechargeable lithium battery as claimed in claim 1 wherein the lithium insertion compound cathode is $Li_xCoO_2$.

12. A non-aqueous rechargeable lithium battery as claimed in claim 1 wherein the lithium compound anode is a carbonaceous compound.

13. A non-aqueous rechargeable lithium battery as claimed in claim 1 wherein the liquid electrolyte solvent comprises an organic carbonate selected from the group consisting of ethylene carbonate, propylene carbonate, diethyl carbonate, and ethyl methyl carbonate.

14. A non-aqueous rechargeable lithium battery as claimed in claim 1 wherein the liquid electrolyte solute comprises a lithium salt selected from the group consisting of $LiBF_4$ and $LiPF_6$.

15. A non-aqueous rechargeable lithium battery having a maximum operating charging voltage comprising
  (a) a lithium insertion compound cathode;
  (b) a lithium compound anode;
  (c) a non-aqueous liquid electrolyte;
  (d) an internal electrical disconnect device, said disconnect device activating at a predetermined internal pressure; and
  (e) a monomer additive mixed in said liquid electrolyte, said monomer additive polymerizing at battery voltages greater than the maximum operating voltage thereby generating gas and pressure activating the disconnect device during overcharge abuse.

16. A non-aqueous rechargeable lithium battery as claimed in claim 15 wherein the mixture of liquid electrolyte and monomer additive comprises less than about 5% monomer additive by weight.

17. A non-aqueous rechargeable lithium battery as claimed in claim 16 wherein the monomer additive is aromatic.

18. A non-aqueous rechargeable lithium battery as claimed in claim 17 wherein the aromatic additive is selected from the group consisting of: thiophene, 3-bromothiophene, 3-chlorothiophene, 3-fluorothiophene, 1,2-dimethoxybenzene, 1-methyl-3-(pyrrol-1-ylmethyl) pyrridinium tetrafluoroborate, biphenyl and furan.

* * * * *

UNITED STATES PATENT AND TRADEMARK OFFICE
CERTIFICATE OF CORRECTION

PATENT NO : 5,776,627
DATED : July 7, 1998
INVENTOR(S): Huanyu Mao and Ulrich Von Sacken It is certified that error appears in the above-identified patent and that said Letters Patent is hereby corrected as shown below:

Column 7, line 53, "650 mm" should read --65 mm--.

Signed and Sealed this

Fourth Day of May, 1999

Attest:

Q. TODD DICKINSON

*Attesting Officer*          *Acting Commissioner of Patents and Trademarks*